United States Patent [19]

Baxter et al.

[11] 4,242,659
[45] Dec. 30, 1980

[54] THIN FILM RESISTANCE THERMOMETER DETECTOR PROBE ASSEMBLY

[75] Inventors: Ronald D. Baxter; Paul J. Freud, both of Furlong, Pa.

[73] Assignee: Leeds & Northrup Company, North Wales, Pa.

[21] Appl. No.: 84,942

[22] Filed: Oct. 15, 1979

[51] Int. Cl.³ .......................... H01C 7/00; G01K 3/00
[52] U.S. Cl. ..................................... 338/28; 73/362.8
[58] Field of Search ................... 338/22, 23, 25, 28, 338/229; 73/362.8, 362 AR; 29/612

[56] References Cited

U.S. PATENT DOCUMENTS

| 2,988,717 | 6/1961 | Bergsma | 73/362 AR X |
| 3,167,733 | 1/1965 | Di Noia | 73/362 AR X |
| 3,508,185 | 4/1970 | Tulchinsky | 73/362 AR |
| 3,896,409 | 7/1975 | Michelig et al. | 338/229 X |
| 3,936,789 | 2/1976 | Matzen et al. | 357/28 X |
| 4,085,398 | 4/1978 | Bertram et al. | 338/25 |
| 4,087,775 | 5/1978 | MacKenzie et al. | 338/28 |
| 4,103,275 | 7/1978 | Diehl et al. | 338/25 |
| 4,146,865 | 3/1979 | Scharbach et al. | 338/229X |
| 4,186,368 | 1/1980 | White et al. | 73/362 AR X |

Primary Examiner—C. L. Albritton
Attorney, Agent, or Firm—William G. Miller, Jr.; Raymond F. MacKay

[57] ABSTRACT

A resistance thermometer probe assembly is constructed by locating a header assembly in the end of a cylindrical sleeve. The header is constructed as a stack of discs. The disc exposed to the environment is of stainless steel and the disc supporting the thin film resistance thermometer chip is of ceramic. A copper disc is brazed between the ceramic and the stainless steel to accommodate the different thermal coefficients of expansion. Nail-head pins are brazed to a thick film deposit on the exposed face of the ceramic disc and the resistance thermometer chip is connected electrically between the pins.

7 Claims, 3 Drawing Figures

THIN FILM RESISTANCE THERMOMETER DETECTOR PROBE ASSEMBLY

BACKGROUND OF THE INVENTION

In the construction of resistance thermometer detector probes, it is important to provide an assembly constructed such that the resistance thermometer element is in good thermal contact with the object or region in which the temperature measurement is desired while at the same time being sufficiently sturdy in construction to withstand any shocks or vibrations to which it may be subjected and at the same time being resistant to other environmental conditions such as chemical attack, etc. When the resistance thermometer element is a thin film element, the above requirements are of equal importance or of more importance than they are with regard to the resistance thermometer assemblies of the wound-wire type.

Prior art devices have not had sufficiently short response times, sufficiently short immersion depths, and sufficient resistance to shock and vibration to make them useful in many applications where accurate temperature measurements are desired. It is therefore an object of this invention to provide a detector probe assembly for thin film resistance elements which is resistant to shock and vibration and which has a quick response to temperature change while at the same time being simple and easy to construct, and therefore inexpensive to manufacture.

SUMMARY OF THE INVENTION

The resistance thermometer probe assembly of this invention utilizes a cylindrical sleeve with a header mounted in the end of the sleeve. The header includes a first button of thermally conductive material, a second button of soft metal having a high thermal conductivity and a high diffusivity along with a third button of electrically insulating material. Means are provided for joining these three buttons to form a sandwich such that the second button is between the first and third buttons with good thermal contact provided therebetween. A thick film is deposited on the exposed surface of the third button. That film has three sections, one is in the center region of the surface and the other two are located in flanking relationship to the center region. A thin film resistance thermometer chip with its associated thin film resistance thermometer is affixed to the center region with connectors being affixed to the flanking regions. Means are provided for connecting the contact pads of the resistance thermometer element to the flanking regions so that the element is connected between the connectors.

DESCRIPTION OF THE PREFERRED EMBODIMENT

Figure 1:
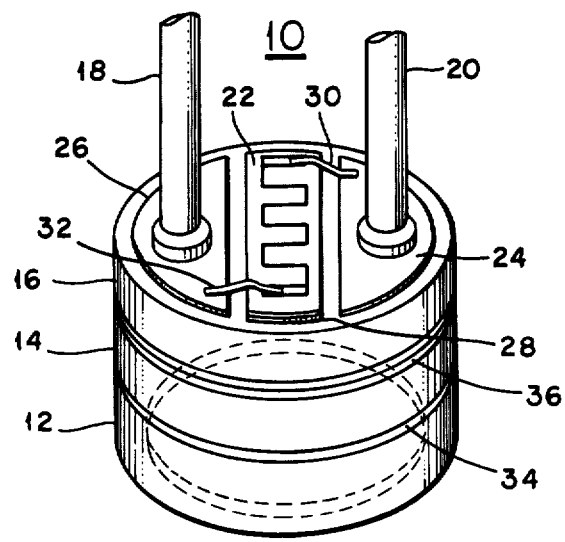
FIG. 1 is a perspective view of the header on which the resistance thermometer element is mounted.

In FIG. 1 there is shown a perspective view of a header which carries the thin film resistance thermometer and which is designed for mounting in an end of a cylindrical sleeve to form a resistance thermometer detector probe assembly in accordance with this invention. The header 10 includes a first button 12 of thermally conductive material which may, for example, be 316 stainless steel or Inconel. A second button 14 is a soft metal having a high thermal conductivity and a high diffusivity. Thus, the button 14 may be a disc of copper which may have a thickness of approximately the same magnitude as the first button. A third button 16 of insulating material provides electrical insulation between a pair of connectors 18 and 20. The insulating material may, for example, be constructed as a disc of BeO or $Al_2O_3$ metalized on the underside.

The buttons 12, 14, and 16 are stacked to form a sandwich such that the button 14 is between the buttons 12 and 16. The buttons are affixed to each other as by means of the brazes 34 and 36 so that the header 10 is an integral unit which may be usually welded into the end of a cylindrical sleeve to form a probe assembly.

Figure 2:
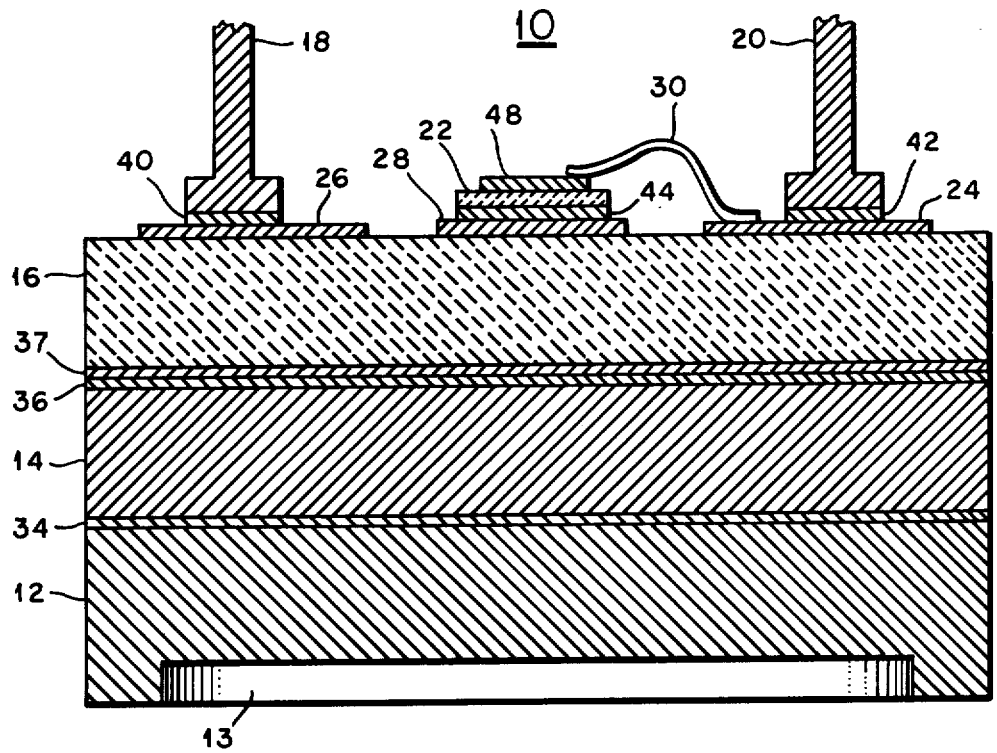
FIG. 2 is a cross-section of the header of FIG. 1.

FIG. 2 provides more detail with regard to the header of FIG. 1 in that it shows the elements of the header in cross section. Thus, the disc 12 is shown as having a recessed portion 13 at the bottom part which is normally that part of the header which will be exposed to the region at which the temperature is to be measured. A soft metal disc 14 which may be of copper is then brazed by means of the braze 34 to the disc 12 so that there is good thermal contact between the two discs. An electrical insulator in the form of the disc 16 is then brazed by means of the braze 36 to the top of the disc 14. The braze is made possible by the metalized coating on the bottom of the disc 16 shown as 37.

The top of the disc 16 has three areas which have a thick film deposit, namely the deposits 28, 24, and 26. These conductive deposits are utilized to provide electrical connections between the connectors 18 and 20 which are shown as nail-head pins. The nail-head pins 18 and 20 are brazed to the areas 26 and 24 respectively by the brazes 40 and 42. The centrally located thick film deposit 28 is brazed by means of braze 44 to thin film resistance thermometer detector chip 22, which contains upon its surface the thin film deposit 48 which forms the resistance thermometer. In FIG. 2 one of the contact pads of the resistance thermometer is shown connecting the resistance thermometer detector to the thick film area 24 by way of the connector strap 30.

In a typical example of a useful resistance thermometer detector probe header, the disc 12 may be made of stainless steel or Inconel as previously mentioned, and the disc 14 can be of copper with the disc 16 being of BeO or $Al_2O_3$ with the metalized facing on the bottom, namely the facing 37 being Mo-Mn thick film corresponding with the Mo-Mn thick film areas 28, 24, and 26 which are deposited on the top of the disc 16. Typically, the copper disc 14 can be brazed between the stainless steel disc 12 and the ceramic disc 16 at the same time as the braze of the nail-head pins 18 and 20 to the areas 26 and 24 is accomplished using a gold/copper braze melting at 1010° C. The resistance thermometer detector chip 22, which has a metalized back side, is brazed in a subsequent brazing operation at a lower melting point with an alloy of Cu-Au or Pt-Au-Ag which melts at 800° C. The platinum ribbon straps 30 can be resistance welded between the contact pad on the resistance thermometer chip and the thick film 24, for example.

With the structure as shown, the copper disc 14 provides a stress relief between the disc 12 and the disc 16 which may be, respectively, steel and ceramic. In the absence of the copper disc 14, the ceramic disc would fracture when cycled between the brazing temperature and the room temperature during the manufacturing process because of the thermal expansion mismatch between the discs 12 and 16. There is thus provided by the structure of resistance thermometer detector header 10 of FIGS. 1 and 2 a structure for an element which can be finally welded into the end of a protecting cylindrical sleeve so as to form a probe assembly, the structure being such that it is both small and easy to manufacture, and therefore inexpensive.

Figure 3:
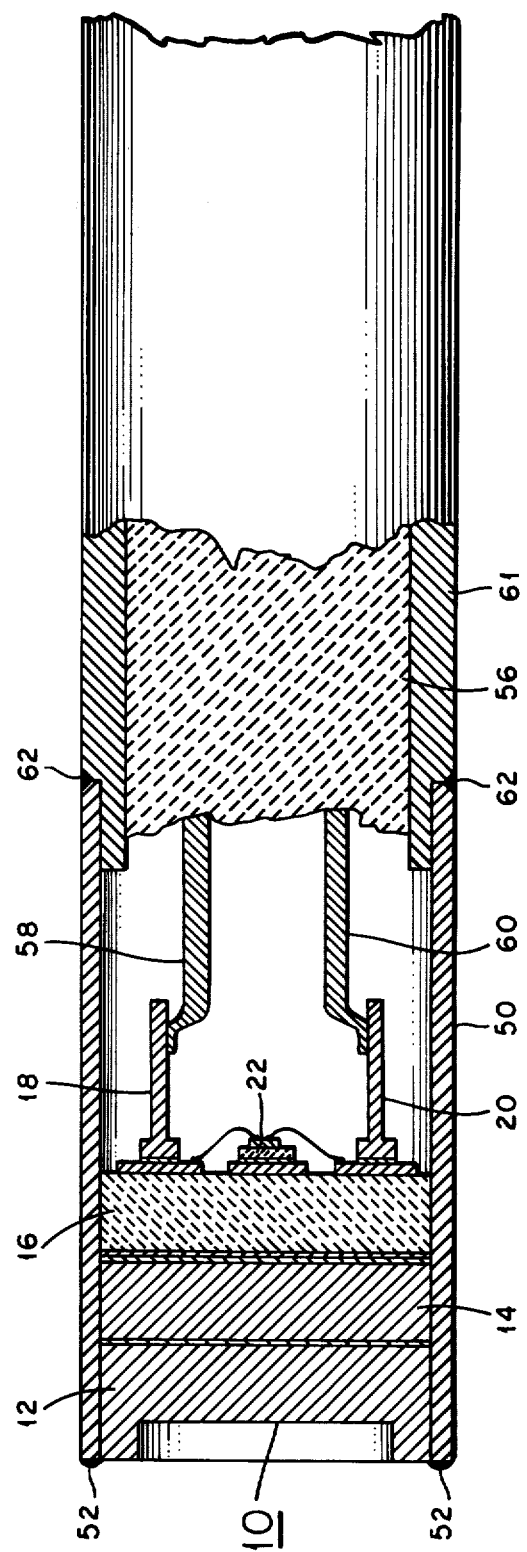
FIG. 3 is a partial cross-section of the cylindrical probe assembly showing the header mounted therein.

The header 10 can be easily mounted into a probe assembly as shown in FIG. 3 where the header 10 is inserted into the end of a cylindrical sleeve 50 to which it is welded by the peripheral weld 52.

The probe body may be typically a swaged, mineral (MgO) insulated structure wherein the insulator 56 provides means for carrying the leads 58 and 60 to the pins 18 and 20 to which the leads are welded. The insulator 56 forms the core of the sheath 61 which may be of the same material as the sleeve 50 and to which the sleeve 50 can be welded at a peripheral weld 62.

It has been found that a probe with a header assembly of the type shown and described in connection with FIGS. 1, 2, and 3 can, with the materials given as an example, have a response time of less than one second compared with the typical response times of prior art probes in the order of 5 to 8 seconds while having great rigidity since the structure has no loose parts and since the lead pins are short and are welded to heavier probe leads with the header welded to become an integral part of the assembly.

It will be evident to those skilled in the art that the material used for the various discs which make up the header assembly, namely 12, 14, and 16 can be of material other than that specifically mentioned above so long as the material of disc 14 is of a sufficiently soft material so that it can accommodate the differences in the thermal expansion coefficients of the material of discs 12 and 16. It is, of course, necessary that the combination of the discs 12, 14, and 16 be such that the good thermal conductivity is provided between the disc 12 and the resistance detector chip 22 to maintain the desired fast response time and it is likewise important that the soft metal used as disc 14 and the insulator used as disc 16 have a high diffusivity (ratio of thermal conductivity to specific heat) also for the purpose of maintaining a short response time.

We claim:

1. A resistance thermometer detector probe comprising:
   a cylindrical sleeve;
   insulator means for carrying leads through said sleeve;
   a header mounted in the end of said sleeve, said header including
   a first button of thermally conductive material;
   a second button of a soft metal having a high thermal conductivity and a high diffusivity;
   a third button of insulating material;
   means for joining said buttons so that said second button is sandwiched between the first and third buttons with good thermal contact therebetween;
   thick film deposits on the exposed surface of said third button, one of said deposits being in the center region of the surface and two other deposits being located in flanking relationship to the center region;
   a thin film resistance thermometer chip affixed to said center region;
   connectors for providing connection of said leads with the respective flanking regions; and
   means for electrically connecting said resistance thermometer between said flanking regions.

2. A resistance thermometer probe as set forth in claim 1 in which the method for joining the buttons is a brazing process.

3. A resistance thermometer probe as set forth in claim 1 or 2 in which the first button is stainless steel, the second button is copper, and the third button is an electrical insulator.

4. A resistance thermometer probe as set forth in claim 3 in which said first, second, and third buttons are joined by brazing.

5. A header for a resistance thermometer probe comprising:
   a first button of thermally conductive, environmentally resistant material;
   a second button of a soft metal having a high thermal conductivity and a high diffusivity;
   a third button of electrically insulating material;
   means for joining said buttons to form a button stack with said second button sandwiched between said first and third buttons so that there is good thermal contact therebetween;
   a thick film deposit on the exposed surface of said third button; and
   a thin film resistance thermometer chip affixed to said thick film deposit so it has good thermal contact with said third button.

6. A header as set forth in claim 5 in which said soft metal is copper.

7. A header as set forth in claim 5 or 6 in which said means for joining said buttons is a braze.

* * * * *